(12) United States Patent
Maxson et al.

(10) Patent No.: US 8,327,409 B2
(45) Date of Patent: Dec. 4, 2012

(54) TESTING CATV NETWORKS WITH DIRECT SEQUENCE SPREAD SPECTRUM SIGNALS

(75) Inventors: Ben Maxson, Beech Grove, IN (US); Koji Okamoto, Indianapolis, IN (US)

(73) Assignee: Acterna LLC, Germantown, MD (US)

( * ) Notice: Subject to any disclaimer, the term of this patent is extended or adjusted under 35 U.S.C. 154(b) by 600 days.

(21) Appl. No.: 12/430,516

(22) Filed: Apr. 27, 2009

(65) Prior Publication Data
US 2009/0271836 A1    Oct. 29, 2009

Related U.S. Application Data

(60) Provisional application No. 61/047,988, filed on Apr. 25, 2008.

(51) Int. Cl.
*H04N 7/173* (2011.01)
(52) U.S. Cl. ......... 725/107; 725/114; 348/181; 348/192
(58) Field of Classification Search .................. 725/107, 725/114; 348/192, 181
See application file for complete search history.

(56) References Cited

U.S. PATENT DOCUMENTS

| | | | |
|---|---|---|---|
| 3,651,403 A | 3/1972 | Fluck, Jr. | 725/144 |
| 3,978,282 A | 8/1976 | Fulton, Jr. | 178/69 G |
| 4,912,721 A | 3/1990 | Pidgeon et al. | 375/149 |
| 5,000,568 A | 3/1991 | Trutna et al. | 356/73.1 |
| 5,585,842 A | 12/1996 | Chappell | 348/192 |
| 5,867,206 A | 2/1999 | Voght et al. | 725/107 |
| 6,157,619 A | 12/2000 | Ozluturk et al. | 370/252 |
| 6,215,812 B1 * | 4/2001 | Young et al. | 375/144 |
| 6,278,485 B1 | 8/2001 | Franchville et al. | 348/192 |
| 6,356,555 B1 | 3/2002 | Rakib et al. | 370/441 |
| 6,934,655 B2 | 8/2005 | Jones et al. | 702/108 |
| 7,246,368 B1 * | 7/2007 | Millet et al. | 725/111 |
| 7,986,729 B2 * | 7/2011 | Kennedy et al. | 375/239 |
| 2005/0129093 A1 * | 6/2005 | Jayasuriyar et al. | 375/141 |
| 2007/0053415 A1 * | 3/2007 | Sayers | 375/142 |

* cited by examiner

*Primary Examiner* — Brian Pendleton
*Assistant Examiner* — Nnenna Ekpo
(74) *Attorney, Agent, or Firm* — Matthew A. Pequignot; Pequignot + Myers LLC (57) ABSTRACT

Use of direct sequence spread spectrum test signals injected at the same time and frequency of active network services to perform non-interfering measurements in the forward and reverse path of a CATV plant. Ideally, a plurality of transmitters, each transmitting a test signal with a unique spreading code, whereby multiple overlapping test signals are received simultaneously at the receiver (CDMA).

6 Claims, 8 Drawing Sheets

TESTING CATV NETWORKS WITH DIRECT SEQUENCE SPREAD SPECTRUM SIGNALS

CROSS-REFERENCE TO RELATED APPLICATIONS

The present invention claims priority from U.S. Patent Application No. 61/047,988 filed Apr. 25, 2008, which is incorporated herein by reference, for all purposes.

TECHNICAL FIELD

The present invention relates to testing cable television (CATV) networks, and in particular to using spread spectrum waveforms in a fully loaded upstream or downstream CATV network to measure frequency response (sweep) without disrupting active services.

BACKGROUND OF THE INVENTION

Upstream and downstream measurements are used to install, adjust, and troubleshoot amplifiers and other plant components on a CATV network or "plant". Conventional testing, using a handheld test meter, includes injecting a test signal of known amplitude onto the plant, whereby the signal propagates through the CATV network, passing through various actives and passives disposed therein. The technician measures the level of the test signal at various points in the network to isolate problems, adjust active network components, e.g. amplifiers, and install/replace components.

Sweep testing systems, such as those disclosed in U.S. Pat. No. 3,651,403 issued to Sidney Fluck, Jr.; U.S. Pat. No. 3,978,282 issued to Forrest Fulton, Jr.; U.S. Pat. No. 4,912,721 issued to Pidgeon et al; U.S. Pat. Nos. 5,867,206 and 5,585,842 issued to Chappell, Daniel K.; U.S. Pat. No. 5,000,568 issued to Trutna et al; U.S. Pat. No. 6,157,619 issued to Ozluturk et al; U.S. Pat. No. 6,278,485 issued to Douglas Franchville et al; U.S. Pat. No. 6,356,555 issued to Rakib et al; U.S. Pat. No. 6,934,655 issued to Jones et al; and U.S. Pat. No. 6,961,370 issued to Chappell, Daniel K, extend the conventional level measurement to include multiple frequencies. "Reverse sweep" tests are currently used to test the health of the return plant at frequencies spaced across the upstream spectrum, e.g. 5 MHz to 45 MHz in North America or 5 MHz to 65 MHz in Europe, while "Forward sweep" tests are used to test the CATV network at downstream frequencies, e.g. 50 MHz to 1000 Mhz in North America or 70 MHz to 1000 MHz in Europe.

Figure 1:
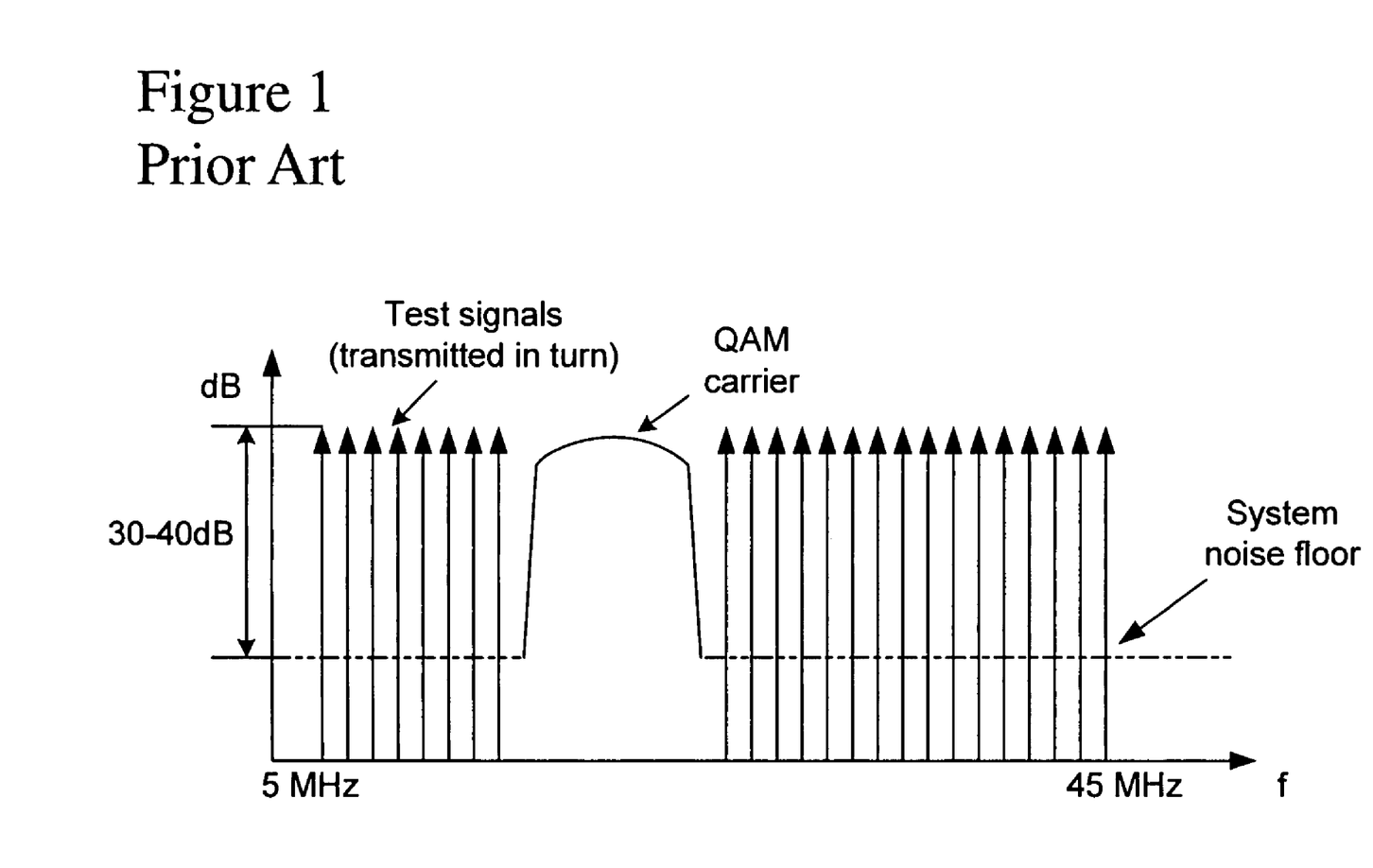
FIG. 1 illustrates a conventional upstream spectrum with ample space for conventional test signals.
Figure 2:
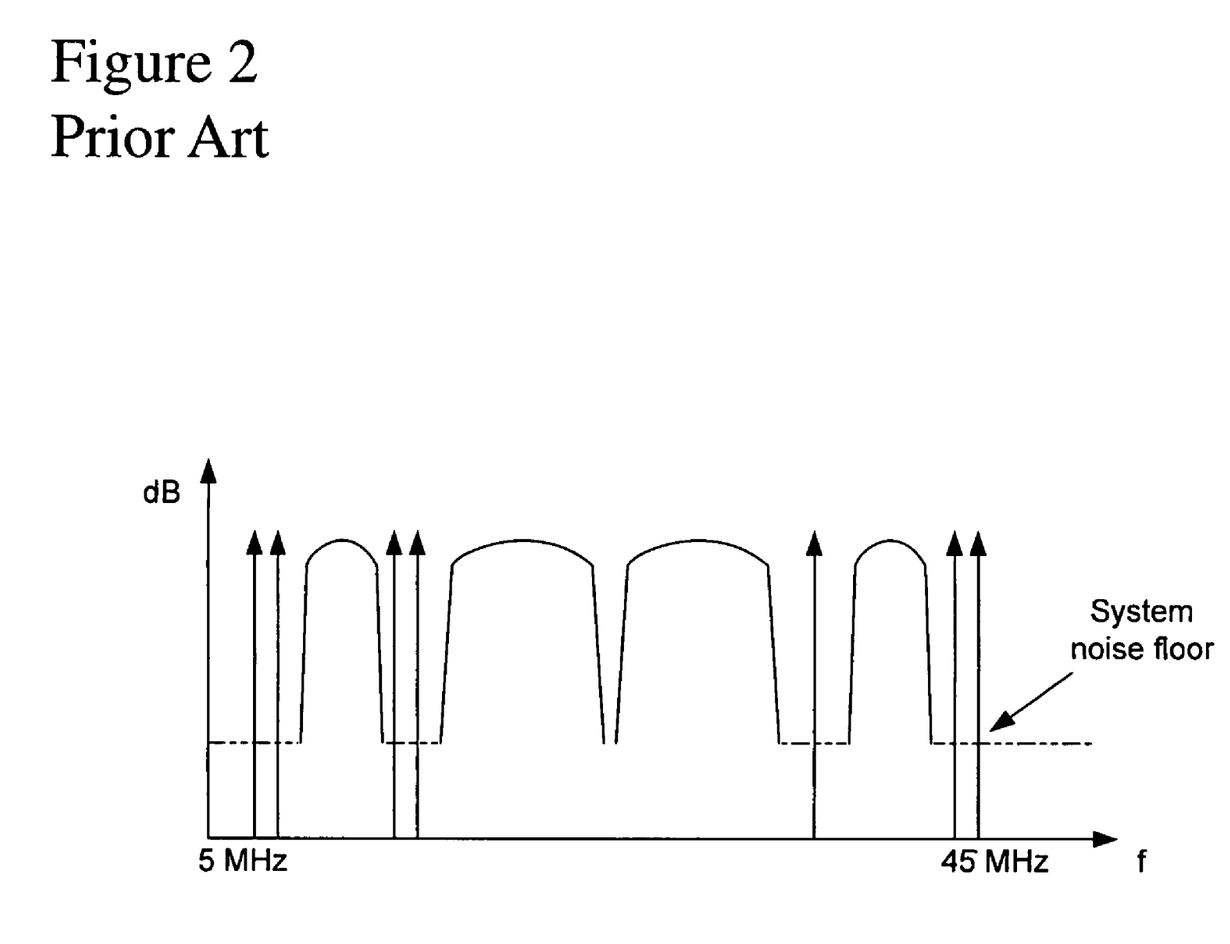
FIG. 2 illustrates a conventional upstream spectrum with very little space for conventional test signals.

When performing reverse sweep test measurements, care must be taken to prevent interference between the injected test signals and the active services on the network, e.g. DOCSIS, set-top box traffic, and VoIP signals. With reference to FIG. 1, one conventional method for preventing interference between test and active signals, is to transmit the test signals, each with a narrow power spectrum, at a subset of frequencies selected to avoid the frequencies used by active services. Unfortunately, the aforementioned method only works in a fairly sparse upstream environment; therefore, when relying on frequency gaps to measure the response, not much information is provided when only a few such gaps exist in a crowded upstream channel plan. As the upstream becomes more crowded, and is extended up to 85 MHz+or higher, e.g. as with DOCSIS 3.0 bonded upstream systems, the traditional technique and test equipment will become less and less effective, as illustrated in FIG. 2.

One potential solution is to exploit the bursty nature of the upstream services to transmit test signals in unused DOCSIS time slots, which could be accomplished by either passively monitoring for the presence of such a slot or by actively reserving a slot and then using it for test purposes rather than data transmission. The former approach could be accomplished by monitoring the burst allocation table sent by the CMTS on the forward path; however, this assumes access to the downstream, which is not present in all use cases, and increases power consumption of the meter. Likewise, actively reserving a slot requires two-way connectivity and continuous operation of a cable modem within the meter. In addition, the test slot chosen must also be identified by or communicated to the sweep signal receiving equipment, and synchronizing the test can be complex and problematic. Another limitation of this approach is that it relies on the presence of unused slots; however, if the slots are scarce or non-existent the test may take a long time or fail to complete.

SUMMARY OF THE INVENTION

Accordingly, the present invention relates to a method for measuring the frequency response of a transmission link, having a noise floor level, in an active CATV network transmitting signal traffic to and from customers over the transmission link, the method comprising:

a) generating a first test signal;

b) modulating the test signal using direct sequence spread spectrum with a chip rate, a data rate, and a spreading code length forming a direct sequence spread spectrum test signal;

c) transmitting the direct sequence spread spectrum test data signal into the transmission link at a transmitted power level below the noise floor level to limit interference with the signal traffic;

d) demodulating the direct sequence spread spectrum test signal at a receiver in order to measure the signal level of the first test signal; and e) monitoring the received data signal power level at a receiver, thereby measuring the gain of the channel at the test signal's frequency.

BRIEF DESCRIPTION OF THE DRAWINGS

The invention will be described in greater detail with reference to the accompanying drawings which represent preferred embodiments thereof, wherein.

DETAILED DESCRIPTION

Figure 3A:
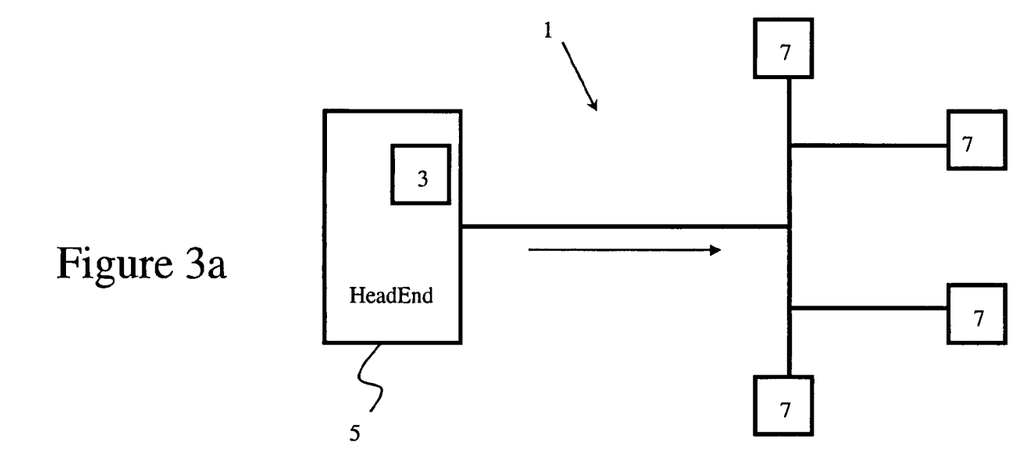
FIGS. 3a and 3b illustrate CATV networks.

With reference to FIG. 3a, the present invention relates to the injection of a plurality of direct sequence spread spectrum (DSSS) signals as test signals, defined by a plurality of different center wavelengths, into a cable television network 1 with a hand held testing device, e.g. DSAM®, or permanent transmitter 3, e.g. an HSM® at the headend 5, and measuring the power levels of the test signals with receivers at one or more locations 7 throughout the CATV network 1, while the active cable channels can be transmitted at the same wavelengths. Typically, the receivers 7 include an RF input, a tuner for selecting the desired wavelength, an analog to digital converter (ADC) for converting the analog signals to digital, and some form of signal processor, e.g. a DSP or an FPGA for processing the received signals. The injected DSSS test signals are transmitted at such a low power, relative to the active services, e.g. cable channels, that performance impact on the cable video traffic is negligible. For testing the return path, the receiver 7 would be in the head end 5, e.g. in an RPM3000® while the transmitters 3 would be positioned at various locations throughout the network 1 in a portable testing device, e.g. a DSAM®, as in FIG. 3b.

In use for testing the forward path of the CATV network 1, a technician connects the portable receiving equipment 7 to the CATV network 1 at a home or a test point in the network 1. Optionally, the headend equipment 5 (or secondary portable transmitter equipment 3) and the portable receiver equipment 7 establish a time synchronization to aide recovery of the signals by the receiver 3. The head end equipment 5 (or secondary portable transmitter equipment 3) generates one or more DSSS signals according to a template and spreading code either (a) established beforehand or (b) sent to the receiving equipment 7 using the CATV network 1. The receiver in the portable receiver equipment 7 detects, demodulates, and accumulates measurements based on knowledge of the spreading codes of the transmitter 3. In one embodiment, the accumulated measurements are communicated back to the transmitting device 3 for display to a secondary user.

Figure 3B:
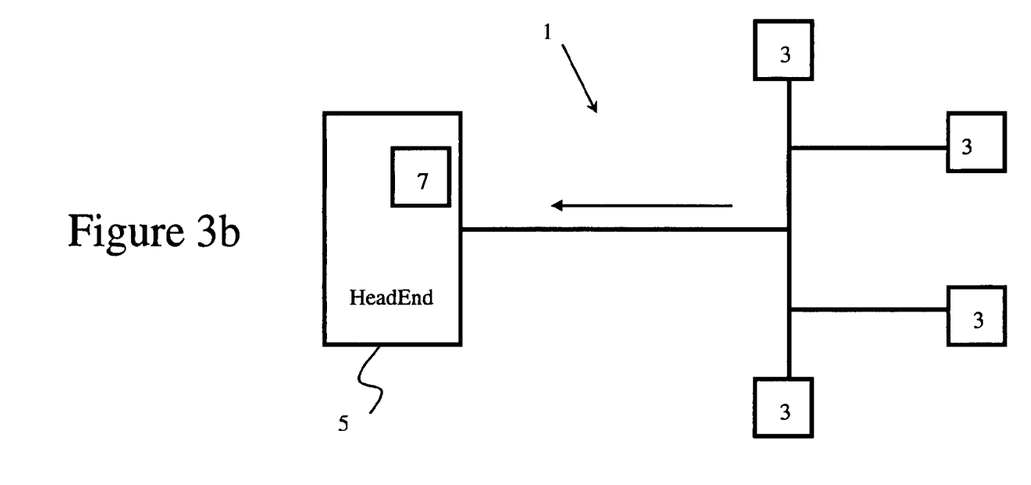

In use for testing the return path of the CATV network 1, a technician connects the portable transmitter equipment 3 to the CATV network 1 at home or test point in network 1. Optionally, the headend receiver equipment 5 (or portable receiver equipment 7) and the portable transmitter equipment 3 establish a time synchronization to aide recovery of the signals by the receiver 5 or 7. The transmitter 3 in the testing device generates one or more DSSS signals according to a template and spreading code either (a) established beforehand or (b) sent to the portable receiver equipment 3 using the CATV network 1. The receiver in the headend equipment 5 or 7 detects, demodulates, and accumulates measurements based on knowledge of the spreading codes of the transmitter equipment 3. In one embodiment the accumulated measurements are communicated back to the transmitting device 3 for display to the user.

A DSSS system is an RF communications system in which the baseband signal bandwidth or the original test signal (Data) is intentionally spread over a larger bandwidth by injecting a higher frequency signal. As a direct consequence, energy used in transmitting the signal is spread over a wider bandwidth, and appears as noise. The ratio (in dB) between the spread baseband and the original signal is called processing gain. Typical spread-spectrum processing gains run from 10 dB to 60 dB.

Figure 4:
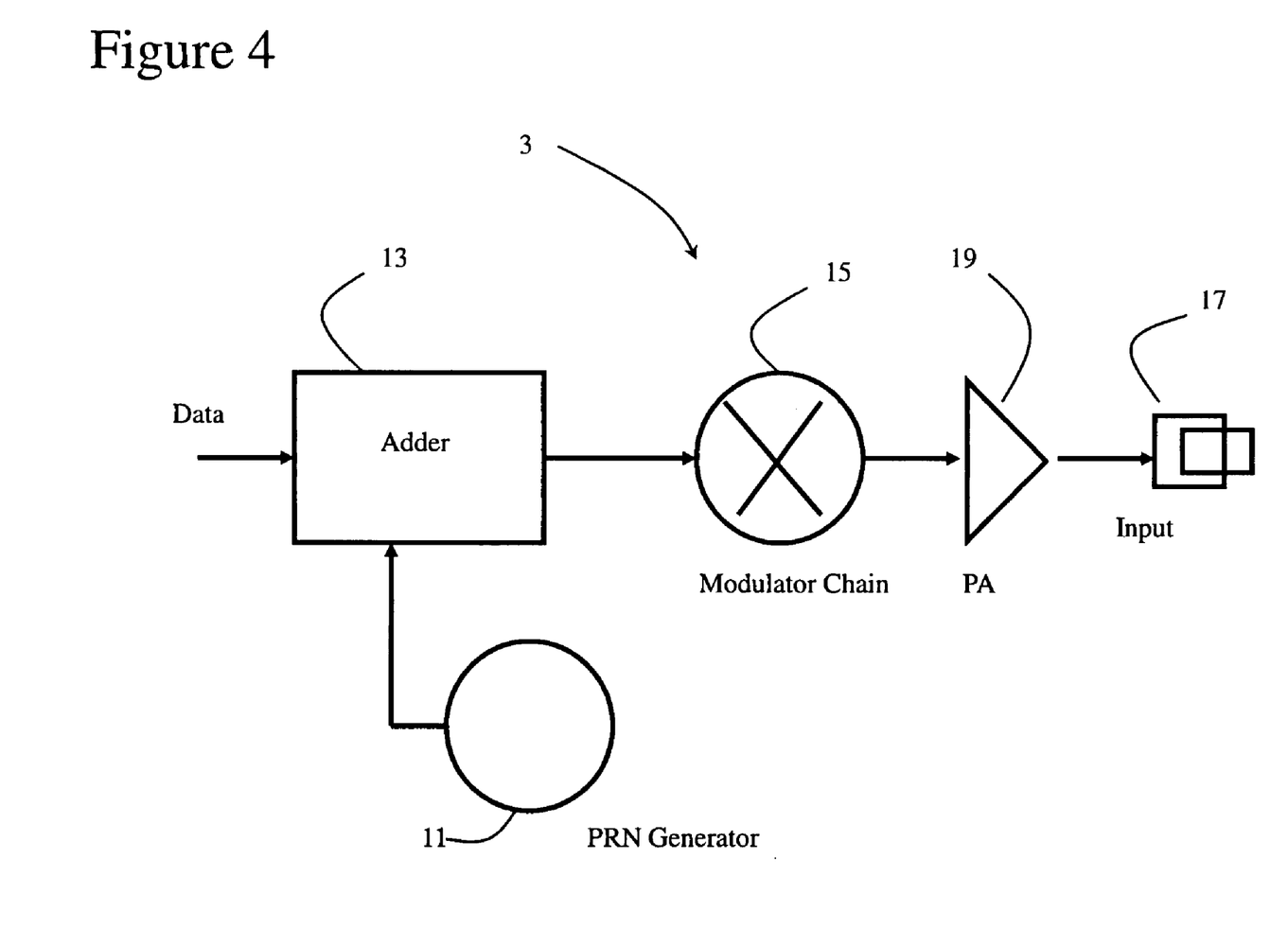
FIG. 4 illustrates a DSSS signal generating system.

With reference to FIG. 4, to apply a spread-spectrum technique in the transmitter equipment 3, a corresponding spread-spectrum code generated by a pseudo-random number (PRN) generator 11 is injected into the original test signal via adder 13 somewhere in the transmitting/modulating chain 15 before an input coupler 17. The injection is called the spreading operation. The effect is to diffuse the information in a larger bandwidth. A power amplifier 19 is provided to boost the DSSS signal.

Conversely, the spread-spectrum code can be removed from the test signal, called a despreading operation, in the receiver 7 at a point in the receiver chain before data retrieval, e.g. demodulation in a demodulator. A despreading operation reconstitutes the test information into its original bandwidth. The same spread spectrum code must be known in advance at both ends of the transmission channel, i.e. the transmitter 3 and the receiver 7.

Interference, e.g. narrowband or wideband, can be ignored if it does not include the key used in the despreading operation. That rejection also applies to other spread-spectrum signals that do not have the right key. Thus different spread-spectrum communications can be active simultaneously in the same band, such as CDMA. The received data signal power levels are measured at the receiver 7, thereby measuring the frequency response of the transmission link.

Figure 5:
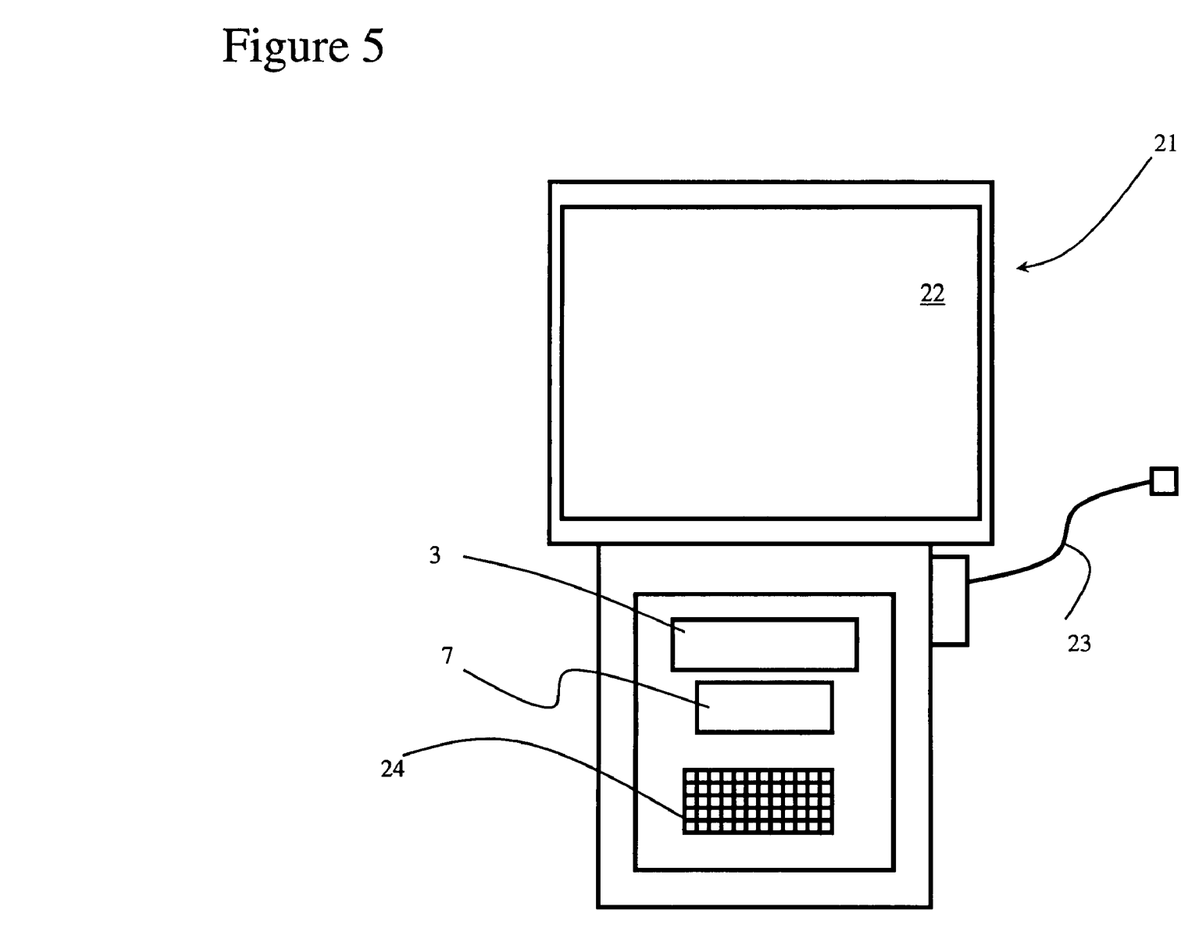
FIG. 5 illustrates a DSSS signal receiver system.

A handheld testing device 21, illustrated in FIG. 5, can include the transmitter equipment 3 and/or the receiver equipment 7, along with a display screen 22, a suitable cable connector 23, and a control processor 24.

DSSS signals, of which code division multiple access (CDMA) signals are a subset, use much wider signaling bandwidth than would be required to transmit the same data at the nominal baud rate. The advantage of a DSSS technique is that a despreading or coding gain can be realized at the receiver, allowing for the reception of the transmitted test signals even when the spread signal is much lower in power than the noise and interference in the band. The amount of despreading gain is approximately equal to 10*log (C) dB, C=B/R, where C is the length of the spreading code, B is the occupied bandwidth (chip rate), and R is the data rate (bit rate) of the underlying signal.

An example, in which the active cable channel wavelengths are present, the chip rate B=200 kChips/sec, the data or bit rate R=2 bits/sec, and the spreading code length C=100 kChips/bit, then the despreading gain is approximately $10*\log_{10}(200000/2)=50$ dB. Note that 1/B=500 ms is the time duration of the complete codeword. For occupied spectrum the data rate is on the order of 0.1 to 100 bits/sec, preferably 1 to 10 bits/sec, which results in a length of spreading code of between 2 kchips/bit and 2000 kchips/bit, preferably 20 kchips/bit and 200 kchips/bit.

Figure 6:
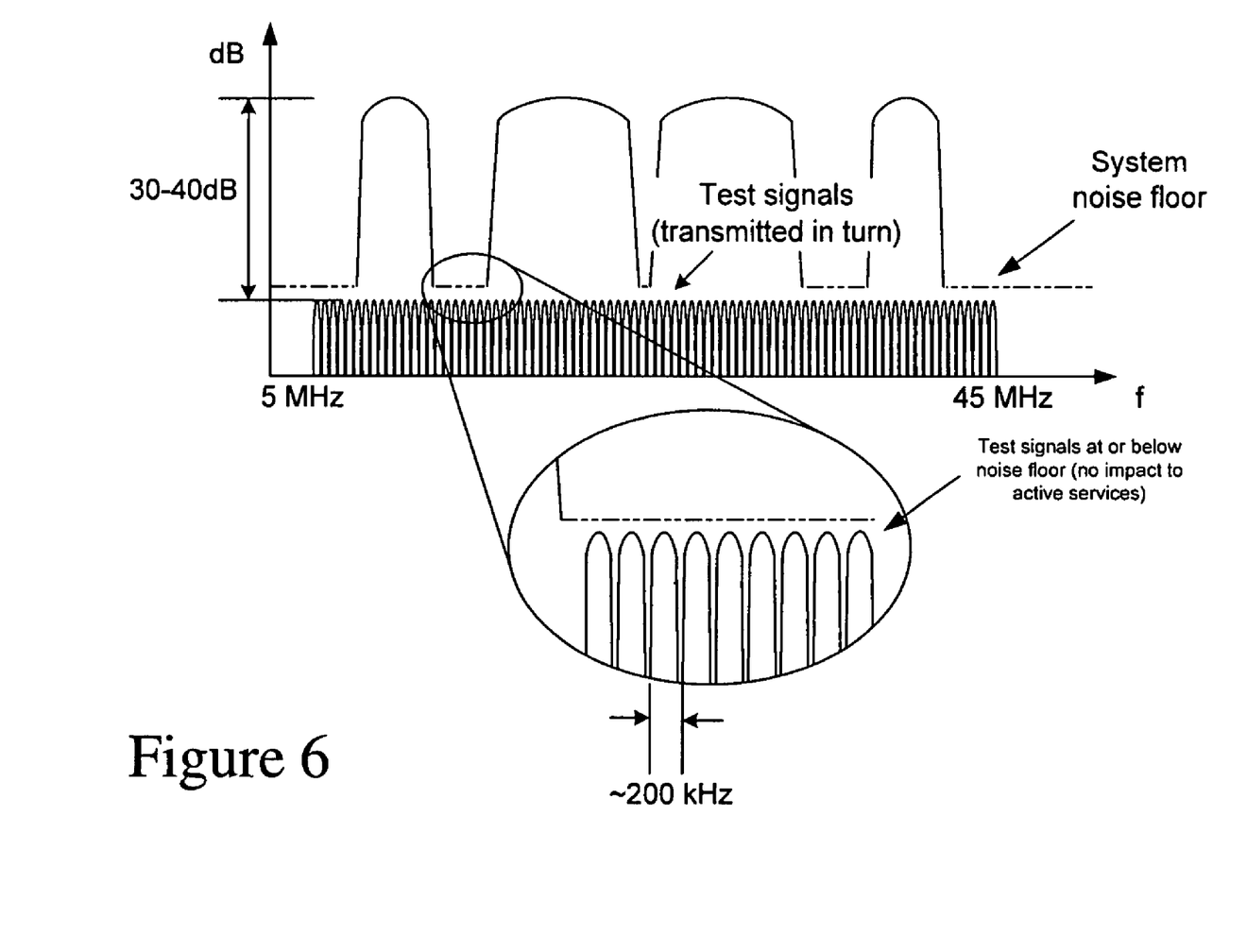
FIG. 6 illustrates a spectrum in accordance with the present invention.

Because the coding gain is so large, e.g. greater than 40 db, preferably greater than 50 dB, the test waveform can be recovered even if transmitted at a much lower power, e.g. less than −40 dB relative to the active signals, in the same channel and at the same time, as illustrated in FIG. 6. If the CDMA test signal were transmitted at −40 dB relative to the native QAM signal, for example, it could be recovered as well as if it were a tone +10 dB stronger than the QAM energy in its bandwidth, but without interfering with the active services, e.g. the performance difference between −40 dB noise floor and $10*\log_{10}(10^{(-40/10)}+10^{(-40/10)}*(200e3/5e6))=-39.8$ dB SNR on the return path is negligible. Accordingly, after despreading, each test signal is as detectable as an unmodulated signal of much greater signal power.

The chip rate, B=200 kChips/sec, chosen for this example would allow for about 250 such measurements between DC and 50 MHz, which is sufficient frequency resolution for display on a handheld meter; however faster or slower rates are possible, e.g. 50 to 1000 kChips/sec, but preferably 100 to 500 kChips/sec.

At the expense of further noise floor elevation, multiple such test signals from multiple transmitters 3 can be transmitted simultaneously, which would directly reduce the measurement time from 500 ms per point*250 points=125 seconds. For example, if the measurement were performed in 4 to 10 MHz, ideally 6 MHz, steps, with 20 to 40, ideally 30, waveforms, i.e. test signals, of 200 kHz received simultaneously, the total measurement time could be reduced to 125 seconds/30=4.2 seconds.

Unique spreading codes can be assigned to the plurality of transmitters 3 disposed at various locations throughout the network 1, each transmitter transmitting a different test signal, whereby multiple overlapping test signals are received simultaneously at a test signal receiver 7 (CDMA), e.g. a hand held test unit.

Figure 7:
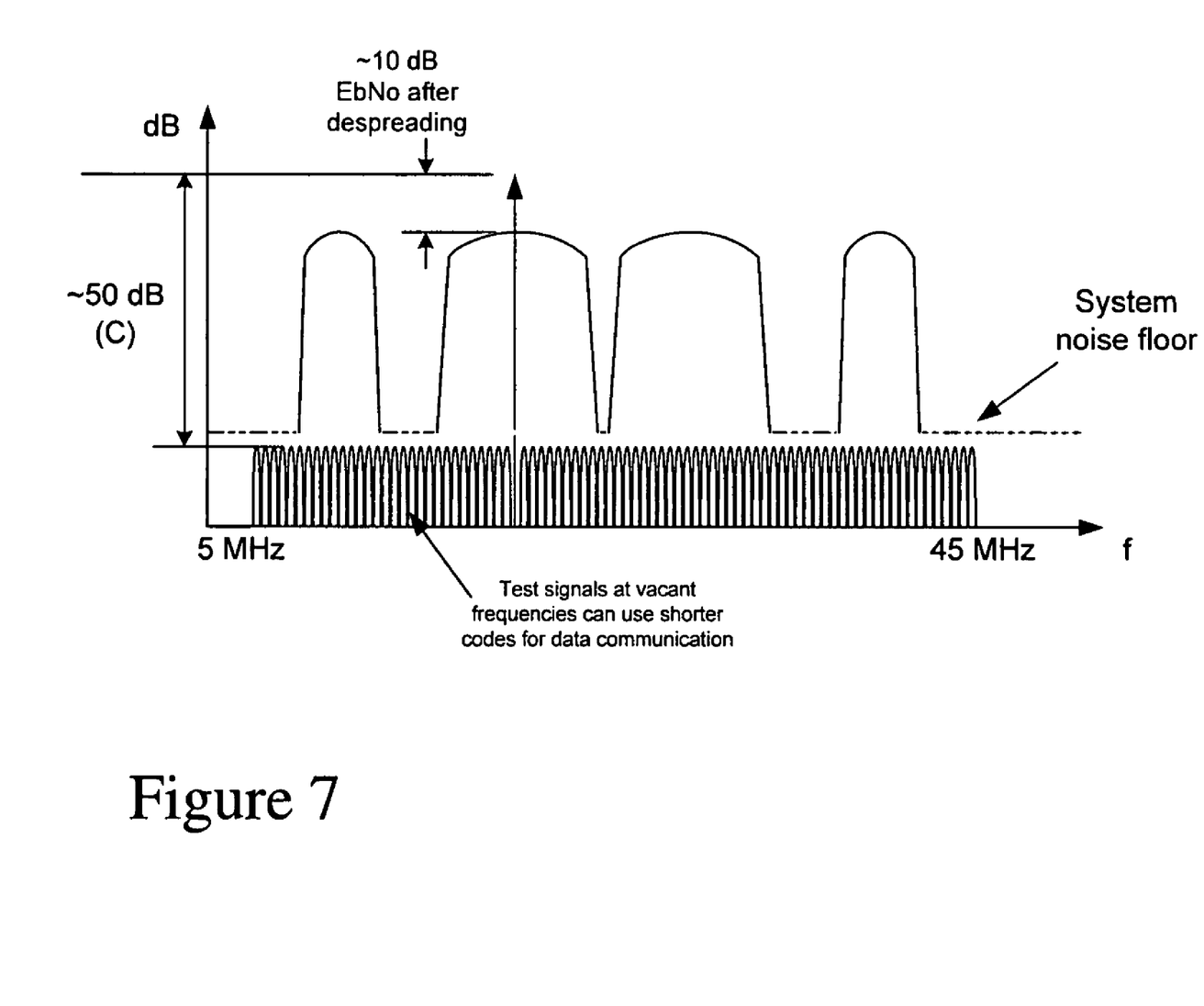
FIG. 7 illustrates a spectrum in accordance with the present invention.

With reference to FIG. 7, DSSS test signals in portions of the spectrum that are unoccupied by active services can be transmitted with much shorter (1000 to 2000 times shorter) spreading codes, e.g. between 5 and 100 kChips/bit, by increasing the data rate R, e.g. by 1000 or 2000 times to 1 to 25 kbits/sec, to improve measurement times at those frequencies. Alternatively, with the same measurement time, i.e. 4.2 seconds, significant amounts of data could be transmitted on the return path. For example, with B=200 kChips/sec and R =10 kbits/sec, C=10*log 10 (200,000/10000) =13 dB coding gain. Such a signal could be placed 3 dB below the noise floor, e.g. @ 10 dB, and received, after despreading with the ratio of the Energy per Bit (Eb) to the Spectral Noise Density (No), EbNo =10 dB.

In the future, should real-time demodulation of bursty upstream signals become feasible in the receiving equipment, the active QAM signals could be "removed" by demodulation, to dramatically improve the EbNo of the sweep test signals. As illustrated in FIG. 7, instead of processing the raw RF signals, the DSSS sweep receiver would process the "error vector" from the demodulating equipment, enabling improved upstream data rates through shortened codes or further reduction in transmit power.

The same basic technique can be applied to measure the frequency response and provide telemetry on the forward path as well. Of course, the test signals need to be inserted at lower power levels than the return path due to the higher-order modulations employed e.g. insertion at −45 to −50 dB. This nominally requires a corresponding increase in the code length in order to maintain detectability. Fortunately, the frequency granularity of the sweep can be much larger in the forward direction; on the order of 5 MHz (compared with 200 kHz in the upstream). A code of length 1 MChip, inserted at −50 dB relative to the QAM carrier, could be detected with 10 dB EbNo and would have code length of 200 ms at 5 MChips/sec.

Figure 8:
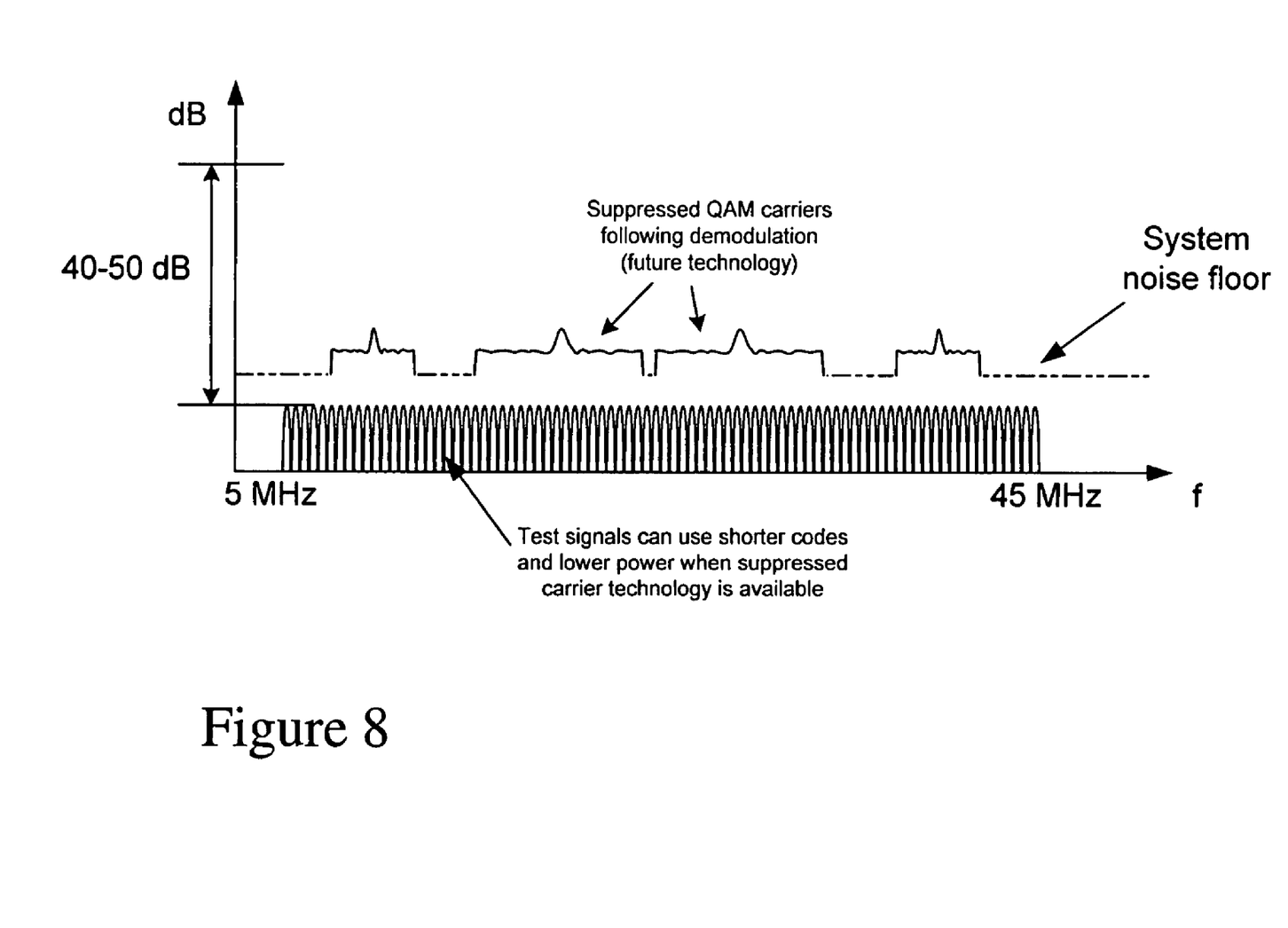
FIG. 8 illustrates a spectrum in accordance with the present invention.

In the forward path, exploiting time-domain gaps in the PHY is completely impossible because the QAM carriers transmit continuously. On the other hand, removing the QAM carriers to increase SNR and/or data rates, as in FIG. 8, is feasible with existing technology.

We claim:

1. A method for measuring the frequency response of a transmission link, having a noise floor level, in an active CATV network transmitting signal traffic, having occupied wavelengths, to and from customers over the transmission link, the method comprising:
    a) generating a first test signal;
    b) modulating the first test signal using direct sequence spread spectrum with a chip rate, a data rate, and a spreading code length forming a direct sequence spread spectrum test signal;
    c) transmitting the direct sequence spread spectrum test data signal into the transmission link at a transmitted power level below the noise floor level to limit interference with the signal traffic;
    during step b) or c), selecting a shorter spreading code length for a wavelength of the direct sequence spread spectrum test signal that will not overlap with an occupied wavelength of the signal traffic than the spreading code length selected for a wavelength of the direct sequence spread spectrum test signal that will overlap with an occupied wavelength of the signal traffic;
    d) demodulating the direct sequence spread spectrum test signal at a receiver in accordance with the selected shorter and longer spreading code lengths in order to measure the signal level of the first test signal; and
    e) monitoring the received data signal power level at a receiver, thereby measuring a frequency response of the transmission link.

2. The method according to claim 1, wherein step a) further comprises transmitting a plurality of test signals from a plurality of transmitters, and repeating steps b) to e) for each of the plurality of test signals.

3. The method according to claim 1, wherein the spreading code length for wavelengths occupied by signal traffic is 20 to 200 Kchips/bit, and the spreading code length for wavelengths unoccupied by signal traffic is 8 to 200 chips/bit.

4. The method according to claim 2, wherein each transmitter has a unique spreading code, whereby multiple overlapping test signals are received simultaneously at the receiver.

5. The method according to claim 1, further comprising transmitting the frequency response back to a desired location over the transmission link.

6. The method according to claim 1, wherein the direct sequence spread spectrum test signal has a coding gain of at least 40 dB.

* * * * *